United States Patent
Greenwood et al.

(10) Patent No.: US 9,286,361 B2
(45) Date of Patent: Mar. 15, 2016

(54) EXTRACT-TRANSFORM-LOAD PROCESSOR CONTROLLER

(71) Applicant: INTERNATIONAL BUSINESS MACHINES CORPORATION, Armonk, NY (US)

(72) Inventors: Leonard D. Greenwood, Milton Keynes (GB); Arron J. Harden, Milton Keynes (GB); Julian J. Vizor, Milton Keynes (GB)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 14/061,051

(22) Filed: Oct. 23, 2013

(65) Prior Publication Data

US 2014/0181006 A1  Jun. 26, 2014

(30) Foreign Application Priority Data

Dec. 20, 2012 (GB) .................................. 1222978.7

(51) Int. Cl.
*G06F 17/30* (2006.01)
(52) U.S. Cl.
CPC .................. *G06F 17/30563* (2013.01)
(58) Field of Classification Search
CPC .................. G06F 17/30283; G06F 17/30286; G06F 17/30289; G06F 17/30292; G06F 21/316; H04L 67/22
See application file for complete search history.

(56) References Cited

U.S. PATENT DOCUMENTS

| | | | |
|---|---|---|---|
| 7,092,968 B1 | 8/2006 | Ebel et al. | |
| 7,681,185 B2 * | 3/2010 | Kapoor | G06F 9/44521 717/106 |
| 7,941,397 B2 | 5/2011 | Wilms et al. | |
| 8,200,614 B2 | 6/2012 | Syed et al. | |
| 8,214,324 B2 | 7/2012 | Joerg et al. | |
| 8,219,518 B2 | 7/2012 | Jin et al. | |
| 8,255,454 B2 | 8/2012 | Broda | |
| 2006/0112123 A1 * | 5/2006 | Clark | G06F 17/246 |
| 2008/0115135 A1 * | 5/2008 | Behnen | G06Q 10/00 718/101 |
| 2010/0185637 A1 | 7/2010 | Morris et al. | |
| 2012/0054147 A1 | 3/2012 | Goetz et al. | |
| 2012/0102007 A1 | 4/2012 | Ramasubramanian et al. | |
| 2013/0117217 A1 * | 5/2013 | Bhide | G06F 17/30563 707/602 |

OTHER PUBLICATIONS

GB Patent Application No. 1222978.7—UK IPO Search Report Mailed Jul. 1, 2013.
Expressor Software Corporation, "Expressor Studio: Design and Run Complex Data Flow Applications in Minutes—For Free!", Expressor Software Corporation, 2010, pp. 1-4.

\* cited by examiner

*Primary Examiner* — Cheryl Lewis
(74) *Attorney, Agent, or Firm* — Law Office of Jim Boice

(57) ABSTRACT

A controller is coupled to an Extract-Transform-Load (ETL) processor, which is connected to data storage devices. The controller comprises: a hardware storage device; a storage control component for storing, on said hardware storage device, a set of criteria for preferredness of ETL stage placements; an I/O input device detecting component for recognizing a proposed placement of a stage on a GUI canvas on the display device; an analytical component for analyzing an eventual result of the proposed placement in an ETL activity represented on the GUI canvas; a comparator for comparing the eventual result of the proposed placement in the ETL activity with the set of criteria; and an indicator control component for, responsive to an outcome of an operation of the comparator, providing to the user an indicator of a degree of preferredness of said proposed placement according to the set of criteria.

20 Claims, 4 Drawing Sheets

EXTRACT-TRANSFORM-LOAD PROCESSOR CONTROLLER

This application is based on and claims the benefit of priority from United Kingdom (GB) Patent Application 1222978.7, filed on Dec. 20, 2012, and herein incorporated by reference in its entirety.

BACKGROUND

The present invention relates to the field of controllers and methods for controlling Extract-Transform-Load (ETL) processors.

In the field of very large data storage repositories, such as data warehouses, there is frequently a need to take data from a plurality of sources, often under the control of heterogeneous data storage systems, and to aggregate the data in such a way as to make it capable of coherent processing. The need for aggregation of data from such a plurality of data sources has given rise to a number of systems designed to perform the tasks of extracting, transforming and loading the data.

Before a repository of data can be effectively used as a source of truly usable information, it is usually created or updated using many sources. Most often, the data that is accumulated (and later used for update of the repository) is of a different format residing on an external system than what is ultimately needed in the repository. The process of acquiring this data and converting it into useful, compatible and accurate data is often labelled ETL (for Extraction, Transformation, and Load).

Extraction is the task of acquiring the data (in whatever format might be possible) from the source systems. This can be as simple as dumping a flat file from a database or spreadsheet, or as sophisticated as setting up relationships with external systems that then supervise the transportation of data to the target system.

Transformation is often more than just converting data formats (although this is a critical step in getting the data to the target system). Data from external systems may contain incompatible or incorrect information, depending on the checks and balances that were in effect on the external system. Part of the transformation step is to "cleanse" or "reject" the data that does not conform. Common techniques used as part of this step include character examination (for example, reject numeric value fields that contain characters) and range checking (reject values outside of an acceptable range). Rejected records are usually deposited in a separate file and are then processed by a more sophisticated tool or manually to correct the problems. The values are then rolled into the transformed set.

Load is the stage in which the captured and transformed data is deposited into the new data store (warehouse, mart, etc.). For SQL-compatible database systems, this process can be accomplished with SQL commands (IMPORT), utilities (LOAD), or integrated tools. Additionally, the total ETL process can be accomplished via third party applications, often decreasing or eliminating the need for custom programming. The ETL process can be as simple as transferring some data from one table to another on the same system. It can also be as complex as taking data from an entirely different system that is thousands of miles away and rearranging and reformatting it to fit a very different system.

At its very simplest level an ETL (Extract Transform Load) job is a process that reads data from one source (such as a database), transforms it (for example, remove trailing spaces), and finally writes it to a target (such as a file). An ETL job design consists of one or more stages, each stage performing a discrete function such as read from database, sort data, merge data etc. The data read from, or written to, stages may be represented as links that join the stages together. ETL job designs can vary from the simple, consisting of only a handful of stages, to the complex where the number of stages can exceed one hundred.

An ETL job design is typically constructed by the user (an 'ETL developer') dragging and dropping stages onto a graphical canvas and then linking their input and outputs together. The stages chosen, the way they are joined together, and the values of properties set will together satisfy the high level requirements for that job. Currently ETL developers need to be extremely knowledgeable about the ETL application and know exactly what stages they should use to achieve this requirement. This becomes a barrier for customers who want to get their developers up and running quickly with their ETL applications. Even for developers who are proficient with the application, it can be hard to remember exactly what stage can be linked to other stages and in what circumstances such links are recommended or not. Such barriers to learning add cost to the process and introduce potentially significant opportunities for human error.

SUMMARY

In one embodiment of the present invention, a controller is coupled to an Extract-Transform-Load (ETL) processor, which is connected to one or more first data storage devices and adapted to render contextual assistance to a user on a display device. The controller comprises: a hardware storage device; a storage control component for storing, on said hardware storage device, a set of criteria for preferredness of ETL stage placements; an I/O input device detecting component for recognizing a proposed placement of a stage on a GUI canvas on the display device; an analytical component for analyzing an eventual result of the proposed placement in an ETL activity represented on the GUI canvas; a comparator for comparing the eventual result of the proposed placement in the ETL activity with the set of criteria; and an indicator control component for, responsive to an outcome of an operation of the comparator, providing to the user an indicator of a degree of preferredness of said proposed placement according to the set of criteria.

In one embodiment of the present invention, a method and/or computer program product operates a controller for an Extract-Transform-Load (ETL) processor connected to one or more first data storage devices and adapted to render contextual assistance to a user on a display device. A storage control component on a hardware storage device stores a set of criteria for preferredness of ETL stage placements, wherein the storage control component is implemented by one or more processors. An I/O input device detecting component recognizes a proposed placement of a stage on a GUI canvas on the display device, wherein the I/O input device detecting component is implemented by one or more processors. An analytical component analyzes an eventual result of the proposed placement in an ETL activity represented on the GUI canvas, wherein the analytical component is implemented by one or more processors. A comparator compares the eventual result of the proposed placement in the ETL activity with the set of criteria, wherein the comparator is implemented by one or more processors. An indicator control component, responsive to an outcome of an operation of the comparator, provides to the user an indicator of a degree of preferredness of said proposed placement according to the set

BRIEF DESCRIPTION OF THE SEVERAL VIEWS OF THE DRAWINGS

An illustrative embodiment of the present invention will now be described by way of example only, with reference to the accompanying drawings, in which.

DETAILED DESCRIPTION

A preferred embodiment of the present invention will now be described, with reference to the appended drawings.

Figure 1:
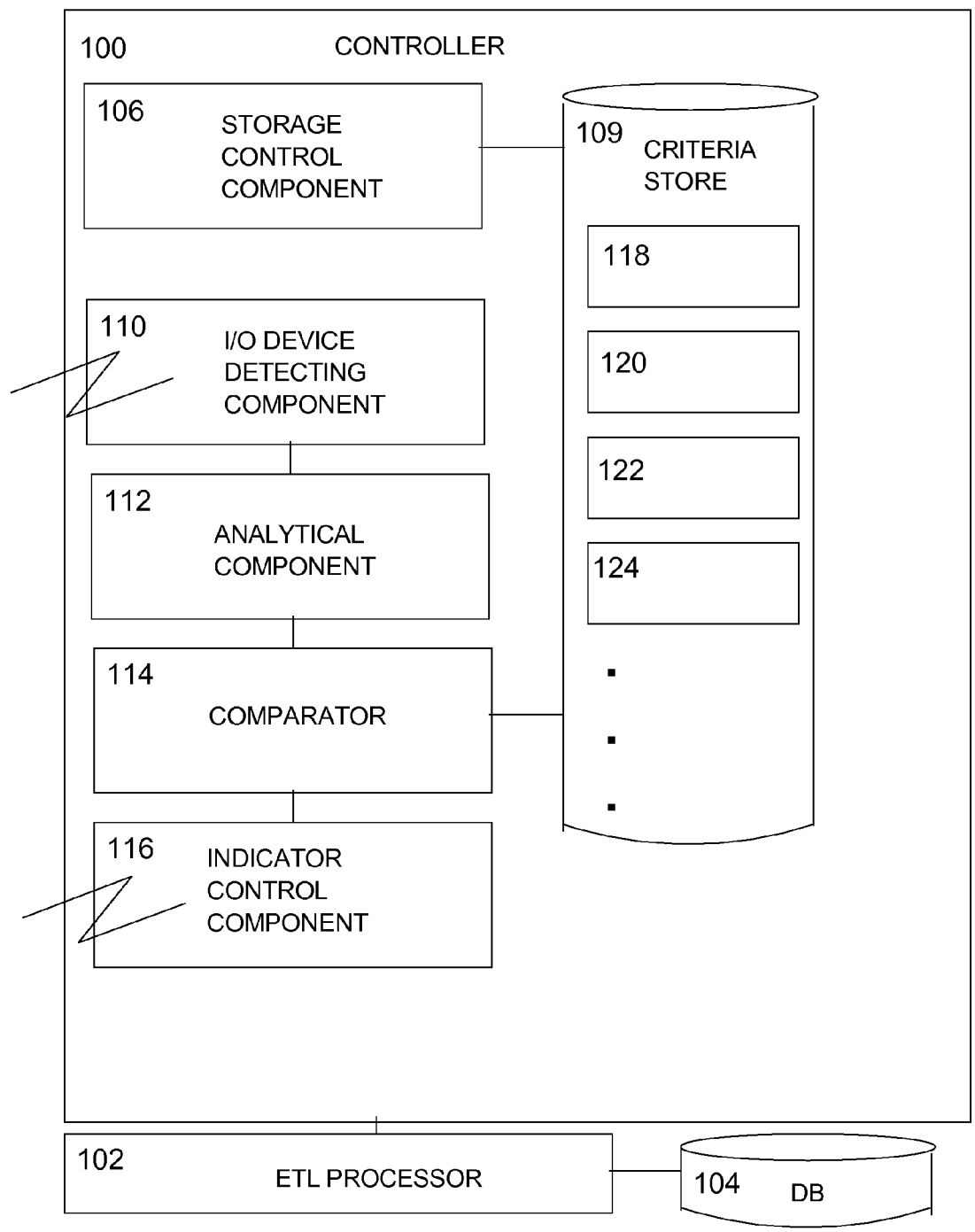
FIG. 1 shows a controller arrangement according to one embodiment of the present invention.
Figure 2:
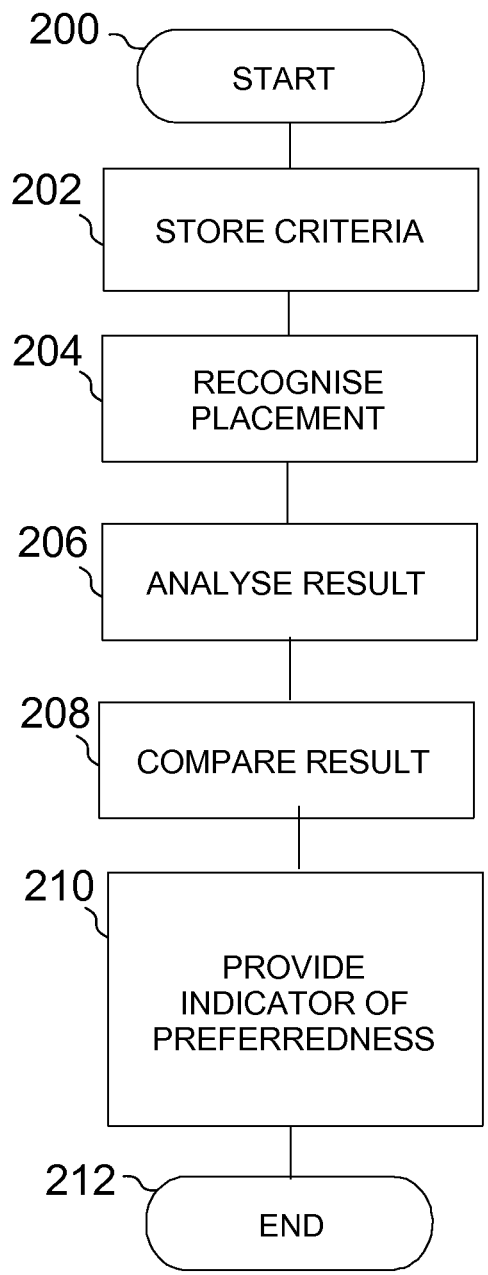
FIG. 2 shows a method of operation of a controller arrangement according to one embodiment of the present invention.

In FIG. 1, there is shown a controller 100 for an Extract-Transform-Load (ETL) processor 102 connected to one or more first data storage devices 104 and adapted to render contextual assistance to a user on a display device. The controller 100 comprises a storage control component 106 for storing on a further storage device 109 a set of criteria for preferredness of ETL stage placements. I/O input device detecting component 110 is adapted to recognise a proposed placement of a stage on a GUI canvas on the display device. Analytical component 112 is arranged to analyse an eventual result of the proposed placement in an ETL activity represented on the GUI canvas and to pass the analysis to a comparator 114. Analytical component 112 uses sets of rules to establish the relative preferredness of various placements of stages, which rules may be based on user inputs, past history and various patterns of placements of stages. Comparator 114 is configured to compare the eventual result of the proposed placement in the ETL activity with the set of criteria stored by the storage control component 106. Responsive to the outcome of the operation of the comparator 114, the indicator control component 116 provides to the user an indicator of a degree of preferredness of the proposed placement with respect to the set of criteria.

In the embodiments of the present invention, the term "degree of preferredness" means the degree on a scale of values from "contextually incorrect or furthest from optimal" to "contextually correct or nearest to optimal" of the proposed stage placement. The degree of preferredness is calculated by the analytical component 112 and the comparator 114 by means of weightings of a number of factors.

In the preferred embodiment, the degree of preferredness may take into account the correctness or incorrectness of the placement, based on the known patterns of such placements. The degree of preferredness may comprise the tendency towards optimality of the placement in the ETL activity. Further, the controller's set of criteria may further comprise optimality of stage placements as analysed by the analytical component, based on information and pattern-based rules established by various means described below. In a first exemplary embodiment, the controller's optimality criteria comprise a defined connectivity attribute of the stage, which may be a known pattern of stages 118, a user-configurable pattern 120, a previously-used pattern 122 or a pattern of non-optimality caused by an unnecessary action 124.

In one embodiment, there is further provided a computer-implemented method of operating a controller for an Extract-Transform-Load, ETL, processor connected to one or more first data storage devices and adapted to render contextual assistance to a user on a display device, comprising, after the start step 200, the steps of storing 202, by a storage control component on a further storage device, a set of criteria for preferredness of ETL stage placements, recognizing 204, by an I/O input device detecting component, a proposed placement of a stage on a GUI canvas on the display device, and analyzing 206, by an analytical component, an eventual result of the proposed placement in an ETL activity represented on the GUI canvas. The method continues in steps of comparing 208, by a comparator, the eventual result of the proposed placement in the ETL activity with the set of criteria, and responsive to an outcome of an operation of the comparator, providing 210, by an indicator control component, to the user an indicator of the degree of preferredness of the proposed placement with respect to the set of criteria. The sequence of processing completes at END step 212.

As the ETL developer begins to drag a stage representation over their job design canvas the system collects metadata including the following information (using caching where appropriate) in order to analyse and apply the rules to the proposed stage placement to provide the context-sensitive part of the drop highlighting:

i) The connectivity of the stage being dragged. Depending on the specific stage, some may be used for output only (a source stage), others input only (a target stage) and some can be used for both input and output (a processing stage). Furthermore, inputs can be subdivided into reference or stream inputs and outputs subdivided into reject and stream outputs. A stage may also have minimum and maximum requirements, for example having one and only one output link, or a minimum of one input link but no maximum. This information is used to match existing stages on the canvas so that only valid connections are considered.

ii) Built-in patterns of existing stages in the job design. There are well known patterns for multiple stages being used together. If the stage being dragged looks as if it will match one of those patterns, this would be given a higher weighting. Some exemplary known patterns are:

read from a sequential file, process it in a transformer stage, and output it again to a different sequential file the reference input to lookup stages often comes from the output of a database stage the output from a source stage will often be joined to a processing stage rather than directly to a target stage a write to a database stage often has a reject output in case the write fails reject outputs often use sequential file or dataset stages iii) User configurable patterns that define commonly used layouts of stages for a specific customer environment. For example, an administrator may choose to promote specific stage configurations as a best practice for their developers and would register those patterns to increase the drop zone strength indicator when recognizing an appropriate "match" with a preferred pattern.

iv) Dynamic patterns based on previous usage of stages in job designs within the current user's environment. For example, a user may frequently use similar patterns of stage layouts when designing jobs and could optionally choose to include that previous usage information when determining the relative "strength indicators" for the drop zones.

v) Potential errors or warnings that would be generated if the stage were to be dropped in a given area. This would give the ETL developer an indication of whether what they are about to drop onto the ETL job canvas is incorrect or non-optimal. For example if a sort stage was going to be dropped on a link where the data has already been sorted this information would be useful to remind the user an additional sort may not be necessary.

Once the above information is collected and analysed, it is used to generate a strength-based drop highlighting around each existing stage where the new stage may be dropped, together with an indication of what the linkage would be to the existing stage. The strength-based drop highlighting may be shown, for example, using coloured areas on the display canvas, by using a dark-to-light shading or, as in the exemplary FIG. 3 and FIG. 4 below, using hatching and cross-hatching to indicate a relative degree of preferredness.

In order to help give a visual indication of the linkage between an existing stage and the new stage being dragged the preferred embodiment makes use of a convention for the way many ETL job designs are laid out:

Stream data will typically flow from left to right.
Reference data (also called lookup data) will typically flow from the bottom of a source stage to the top of another stage
Reject data will typically flow from the bottom of a target stage to the top of another target stage.

These conventions are incorporated into analysis and production of the drop highlighting by using areas above, below, to the left or to the right of a stage to indicate reference, reject, input or output links respectively when highlighting a drop area. In addition to the position of the drop zone relative to a target stage, a link with appropriate line style will also be displayed when the stage being dragged is near a drop zone. The line styles used may be, for example:

Solid line=stream link;
Large dashed line=reject link; and
Small dashed line=reference link.

A tooltip or similar text-based UI indicator may be used to give more details and where necessary an explanation of what the current drop highlighting is indicating (for example "Drop the new sequential file stage here to create a reject output from the database stage").

The following examples demonstrate how such drop highlighting may appear to the user:

Example A

Sequential File Stage Reject Output

Figure 3:
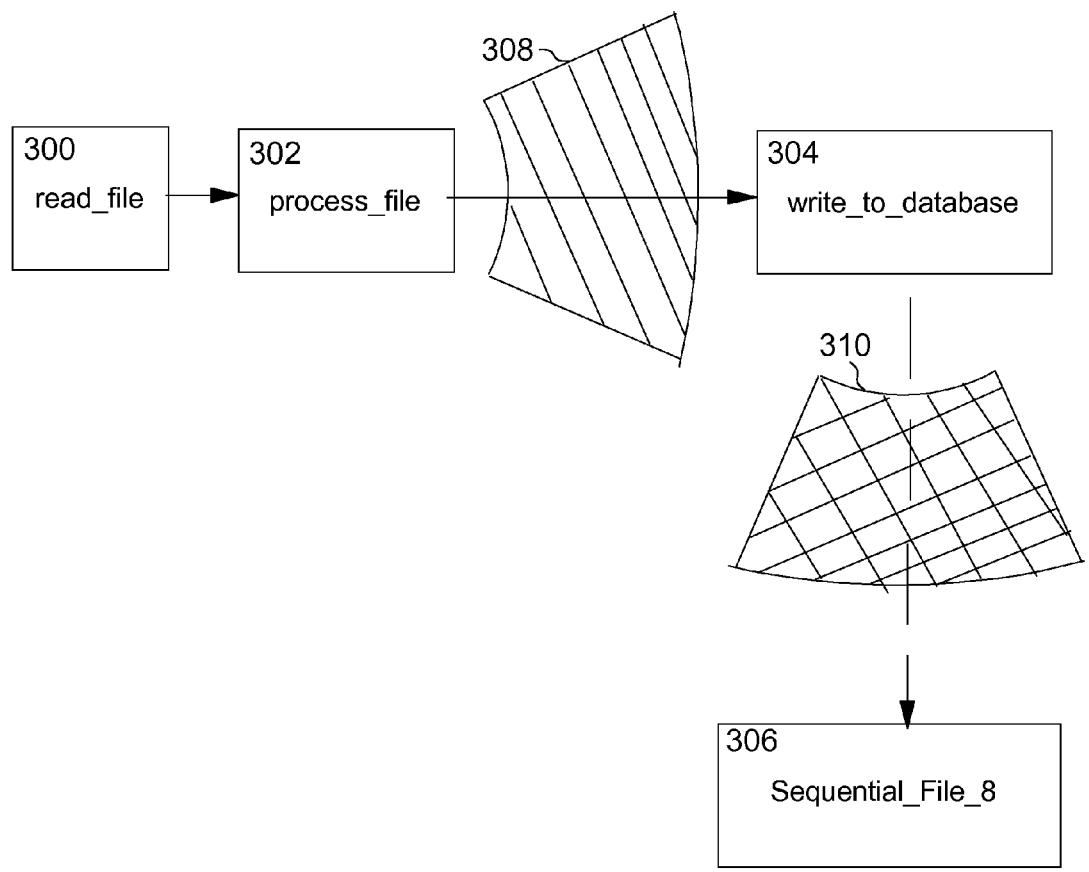
FIG. 3 shows a simple exemplary operation of an embodiment of the present invention.

In this example, shown in FIG. 3, the job is reading from a sequential file 300, processing the data 302 and then writing the results into the database 304. When the user attempts to drag another sequential file stage 306 onto the canvas ("Sequential_File_8"), the system collects and analyses the information described above and produces the highlighting as shown in FIG. 3.

The highlighted areas in FIG. 3 show the user that the new sequential file stage can either be dropped to create an additional stream output 308 of the "process_file" stage (stream outputs appear on the right of a stage), or dropped to create a reject output 310 from the "write_to_database" stage (rejects appear beneath the stage). Since the highlighting around the "write_to_database" stage is darker (i.e. the strength indicator, shown in the figure by cross-hatching), this is the most recommended place to drop the stage. The strength for this action was derived from the information in (ii) above, i.e. a common rule in such a pattern is "a write to a database stage often has a reject output in case the write fails" and "reject outputs often use sequential file or dataset stages".

Example B

Database Reference Lookup

Figure 4:
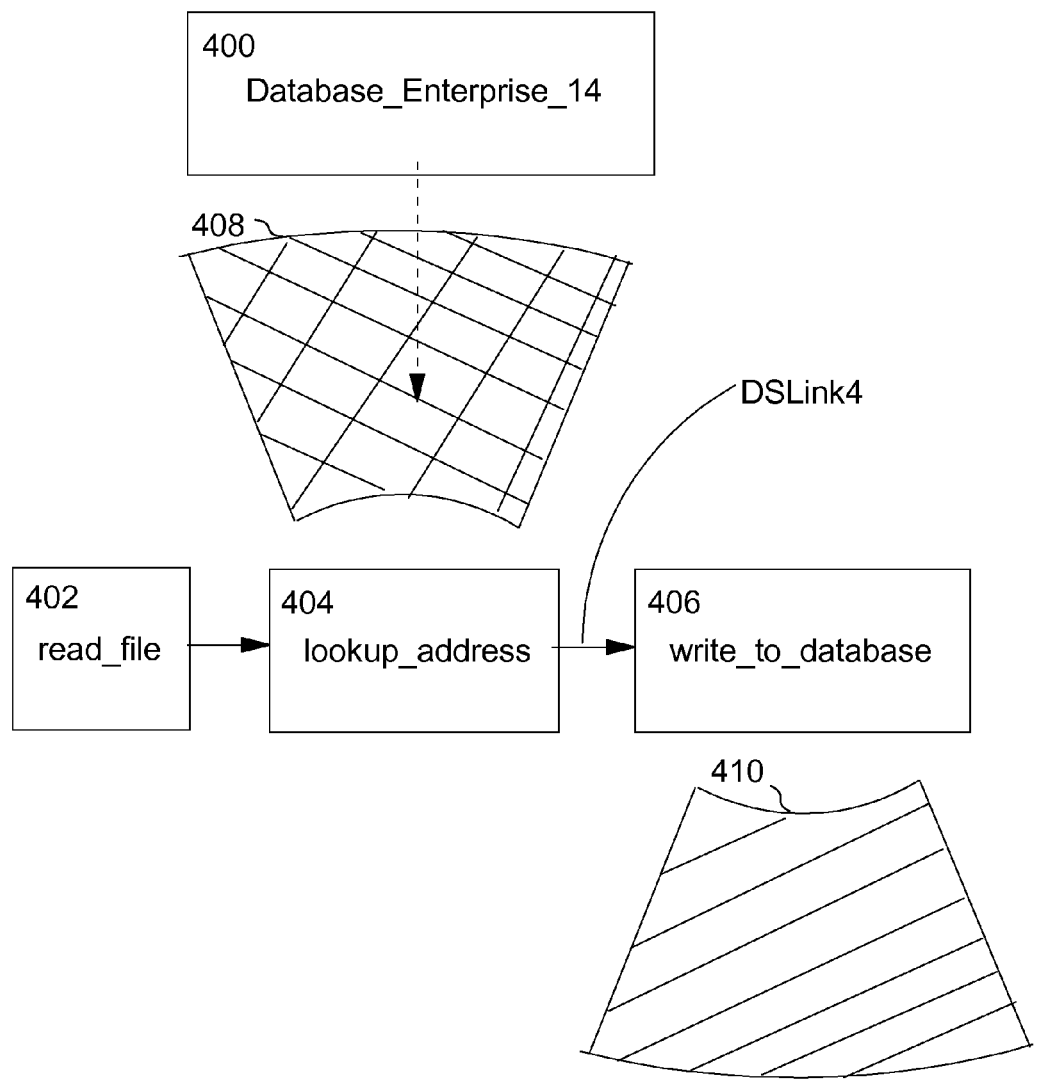
FIG. 4 shows a further simple exemplary operation of an embodiment of the present invention.

In this example, shown in FIG. 4, the job is reading from a sequential file 402, performing a lookup 404 and then writing the results into the database 406. When the user attempts to drag another database stage 400 onto the canvas ("Database_Enterprise_14"), the system collects and analyses the information described above and produces the highlighting as shown in FIG. 4.

The highlighted areas in FIG. 4 show the user that the new database stage can either be dropped to complete the lookup stage 408 as its reference input (reference inputs appear from above the stage), or dropped to create a reject output 410 from the "write_to_database" stage (rejects appear beneath the stage). Since the highlighting around the "lookup_address" stage is darker (i.e. the strength indicator, shown in the figure by cross-hatching), this is the most recommended place to drop the stage. The strength for this action was derived from the information in (ii) above, i.e., a common rule for such a pattern is "the reference input to lookup stages often comes from the output of a database stage".

It will, of course, be clear to one of ordinary skill in the art that the above examples, as shown in FIG. 3 and FIG. 4, are much simplified, and that, in reality, the systems represented by the symbols and structures on the GUI canvas may be of much greater complexity and comprise many more stages. Nevertheless, the drawings as provided should suffice for the purposes of illustrating the operation of preferred embodiments of the present invention, and it will be immediately clear to one of ordinary skill in the art how the preferred embodiments may be extended and varied for the various purposes of controlling ETL processors and their operation.

As is would be desirable to have controllers and methods for controlling Extract-Transform-Load (ETL) processors that address the above-described limitations in the state of the art, the present invention accordingly provides, in a first aspect, controller for an Extract-Transform-Load, ETL, processor connected to one or more first data storage devices and adapted to render contextual assistance to a user on a display device, comprising: a storage control component for storing on a further storage device a set of criteria for preferredness of ETL stage placements; an I/O input device detecting component for recognizing a proposed placement of a stage on a GUI canvas on the display device; an analytical component for analyzing an eventual result of the proposed placement in an ETL activity represented on the GUI canvas; a comparator for comparing the eventual result of the proposed placement in the ETL activity with the set of criteria; and responsive to an outcome of an operation of the comparator, an indicator control component for providing to the user an indicator of a degree of preferredness of said proposed placement according to the set of criteria.

In the embodiments of the present invention, the term "degree of preferredness" means the degree on a scale of values from "contextually incorrect or furthest from optimal" to "contextually correct or nearest to optimal" of the proposed stage placement. The degree of preferredness is calculated by the analytical component and the comparator by means of weightings of a number of factors.

The degree of preferredness may comprise correctness or incorrectness of said stage placement, and may comprise a tendency towards optimality of said stage placement in said ETL activity. The set of criteria may comprise, for example, a defined connectivity attribute of the stage, a known pattern of stages, a user-configurable pattern, a previously-used pattern or a pattern of non-optimality caused by an unnecessary action.

In a second aspect, the present invention provides a computer-implemented method of operating a controller for an Extract-Transform-Load, ETL, processor connected to one or more first data storage devices and adapted to render contextual assistance to a user on a display device, comprising the steps of: storing, by a storage control component on a further storage device, a set of criteria for preferredness of ETL stage placements; recognizing, by an I/O input device detecting component, a proposed placement of a stage on a GUI canvas on the display device; analyzing, by an analytical component, an eventual result of the proposed placement in an ETL activity represented on the GUI canvas; comparing, by a comparator, the eventual result of the proposed placement in the ETL activity with the set of criteria; and responsive to an outcome of an operation of the comparator, providing, by an indicator control component, to the user an indicator of a degree of preferredness of said proposed placement according to the set of criteria.

The method may comprise method steps corresponding to the activities of the components of the controller of the first aspect.

In a third aspect, the present invention provides a computer program comprising computer program code to, when loaded into a computer system and executed thereon, cause the computer to perform the steps of a method according to the second embodiment. Preferred method steps of the second embodiment may be performed by corresponding program code features.

The preferred embodiments of the present invention thus advantageously analyse proposed placements of stages in order to compare the outcomes with previously stored patterns in order to generate context sensitive graphical highlighting to ETL developers when they drag a stage representation over an ETL job design canvas. In addition to standard drag and drop highlighting, the context sensitive part of the highlighting makes use of information that is specific to the ETL job design and the stage being dragged. This allows the controller of the preferred embodiment to show the drop areas highlighted with a strength indicator to show incorrect placements and the most recommended areas where the stage could be dropped, together with the recommended links to existing stages. The strength indicator is based upon a set of rules and criteria defining the relative degree of preferredness of the proposed stage placement with respect to the stage entities and relationships already positioned on the GUI canvas.

An advantage of this technique is that it immediately provides visual feedback to the ETL developers to help them design the job. In addition to this, because the feedback is based on the ETL job context in which the developer is working, the highlights can be tailored such that drop areas which are recommended are displayed with a strength indicator, thereby guiding developers to create better job designs and making it easier for novice users to get started.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A controller for an Extract-Transform-Load (ETL) processor connected to one or more first data storage devices and adapted to render contextual assistance to a user on a display device, the controller comprising:
   a hardware storage device;
   a storage control component for storing, on said hardware storage device, a set of criteria for preferredness of ETL stage placements;
   an I/O input device detecting component for recognizing a proposed placement of a stage on a GUI canvas on the display device;
   an analytical component for analyzing an eventual result of the proposed placement in an ETL activity represented on the GUI canvas;
   a comparator for comparing the eventual result of the proposed placement in the ETL activity with the set of criteria; and
   an indicator control component for, responsive to an outcome of an operation of the comparator, providing to the user an indicator of a degree of preferredness of said proposed placement according to the set of criteria.

2. The controller of claim 1, the degree of preferredness comprising correctness or incorrectness of said stage placement.

3. The controller of claim 1, the degree of preferredness comprising a tendency towards optimality of said stage placement in said ETL activity.

4. The controller of claim 1, the set of criteria comprising a defined connectivity attribute of the stage.

5. The controller of claim 1, the set of criteria comprising a known pattern of stages.

6. The controller of claim 1, the set of criteria comprising a user-configurable pattern.

7. The controller of claim 1, the set of criteria comprising a previously-used pattern.

8. The controller of claim 1, the set of criteria comprising a pattern of non-optimality caused by an unnecessary action.

9. A method of operating a controller for an Extract-Transform-Load (ETL) processor connected to one or more first data storage devices and adapted to render contextual assistance to a user on a display device, the method comprising:
   storing, by a storage control component on a hardware storage device, a set of criteria for preferredness of ETL stage placements, wherein the storage control component is implemented by one or more processors;
   recognizing, by an I/O input device detecting component, a proposed placement of a stage on a GUI canvas on the display device, wherein the I/O input device detecting component is implemented by one or more processors;
   analyzing, by an analytical component, an eventual result of the proposed placement in an ETL activity represented on the GUI canvas, wherein the analytical component is implemented by one or more processors;
   comparing, by a comparator, the eventual result of the proposed placement in the ETL activity with the set of criteria, wherein the comparator is implemented by one or more processors; and
   responsive to an outcome of an operation of the comparator, providing, by an indicator control component, to the user an indicator of a degree of preferredness of said proposed placement according to the set of criteria, wherein the indicator control component is implemented by one or more processors.

10. The method of claim 9, the degree of preferredness comprising correctness or incorrectness of said stage placement.

11. The method of claim 9, the degree of preferredness comprising a tendency towards optimality of said stage placement in said ETL activity.

12. The method of claim 9, wherein the set of criteria comprises a defined connectivity attribute of the stage.

13. The method of claim 9, wherein the set of criteria comprises a known pattern of stages.

14. The method of claim 9, wherein the set of criteria comprises a user-configurable pattern.

15. The method of claim 9, wherein the set of criteria comprises a previously-used pattern.

16. The method of claim 9, wherein the set of criteria comprises a pattern of non-optimality caused by an unnecessary action.

17. A computer program product for operating a controller for an Extract-Transform-Load (ETL) processor connected to one or more first data storage devices and adapted to render contextual assistance to a user on a display device, the computer program product comprising a non-transitory computer readable storage medium having program code embodied therewith, the program code readable and executable by a processor to perform a method comprising:
   storing, by a storage control component on a hardware storage device, a set of criteria for preferredness of ETL stage placements;

recognizing, by an I/O input device detecting component, a proposed placement of a stage on a GUI canvas on the display device;

analyzing, by an analytical component, an eventual result of the proposed placement in an ETL activity represented on the GUI canvas;

comparing, by a comparator, the eventual result of the proposed placement in the ETL activity with the set of criteria; and responsive to an outcome of an operation of the comparator, providing, by an indicator control component, to the user an indicator of a degree of preferredness of said proposed placement according to the set of criteria.

18. The computer program product of claim 17, the degree of preferredness comprising correctness or incorrectness of said stage placement.

19. The computer program product of claim 17, the degree of preferredness comprising a tendency towards optimality of said stage placement in said ETL activity.

20. The computer program product of claim 17, wherein the set of criteria comprises a defined connectivity attribute of the stage.

* * * * *